United States Patent [19]
Takahashi et al.

[11] Patent Number: 5,576,587
[45] Date of Patent: Nov. 19, 1996

[54] HIGH-SPEED ROTOR AND CONTROLLER FOR CONTROLLING MAGNETIC BEARINGS USED THEREFOR

[75] Inventors: Naohiko Takahashi, Ibaraki-ken; Minoru Hiroshima, Ushiku; Yasuo Fukushima, Tsuchiura, all of Japan

[73] Assignee: Hitachi, Ltd., Tokyo, Japan

[21] Appl. No.: 404,742

[22] Filed: Mar. 15, 1995

[30] Foreign Application Priority Data

Mar. 18, 1994 [JP] Japan .................... 6-048278

[51] Int. Cl.⁶ ...................................... H02K 7/09
[52] U.S. Cl. .................. 310/90.5; 318/611; 318/632; 361/144
[58] Field of Search ............... 310/90.5; 318/632, 318/611; 361/144; 364/463

[56] References Cited

U.S. PATENT DOCUMENTS

| | | | |
|---|---|---|---|
| 4,841,212 | 6/1989 | Matsushita et al. | 310/90.5 |
| 4,999,534 | 3/1991 | Andrianos | 310/90.5 |
| 5,093,754 | 3/1992 | Kawashima | 361/144 |
| 5,130,589 | 7/1992 | Kanemitsu | 310/90.5 |
| 5,140,209 | 8/1992 | Whorlow | 310/90.5 |
| 5,247,219 | 9/1993 | Nakagawa et al. | 310/90.5 |
| 5,256,952 | 10/1993 | Yoneyama et al. | 318/629 |
| 5,264,982 | 11/1993 | Cox et al. | 361/144 |
| 5,306,975 | 4/1994 | Bichler | 310/90.5 |
| 5,313,399 | 5/1994 | Beale | 364/463 |
| 5,486,729 | 1/1996 | Matsushita et al. | 310/90.5 |
| 5,491,396 | 2/1996 | Takahashi et al. | 318/632 |

FOREIGN PATENT DOCUMENTS 5-280542 10/1993 Japan.

*Primary Examiner*—Thomas M. Dougherty
*Assistant Examiner*—Elvin G. Enad
*Attorney, Agent, or Firm*—Antonelli, Terry, Stout & Kraus

[57] ABSTRACT

Active magnetic bearings supporting a rotor operated at high speeds is controlled by a controller. Tracking filters provided in the controller pick up forward vibration components in synchronism with the rotational speeds from the displacement signals of the rotor, and a mode separating circuit provided in a mode gain controller takes out displacements of the 3rd and 4th modes. Then, a gain controller provided in the mode gain controller determines suitable gains for the separated displacement signals. A mode synthesizing circuit provided in the mode gain controller synthesizes a controlled variable for each of the bearings from the control signals that are processed for the respective modes. By adding the control variable to the respective bearings, the vibration amplitude is suppressed in critical speed zones of high orders, and the rotor is stably operated up to a high-speed range.

8 Claims, 9 Drawing Sheets

TARGET VALUE

HIGH-SPEED ROTOR AND CONTROLLER FOR CONTROLLING MAGNETIC BEARINGS USED THEREFOR

BACKGROUND OF THE INVENTION

The present invention relates to a high-speed rotor and, particularly, to a controller for controlling magnetic bearings that are desirably used for a supercritical rotor.

Conventional radial magnetic bearings use electromagnets that are arranged in opposing relationship to each other. By this arrangement, a rotor is attracted and is supported by magnetic bearings in a contactless manner. In order to effectively utilize the attractive force, the rotor is usually fitted with magnetic steel sheets and forms a magnetic loop together with a laminated core of the electromagnet. In order to stably support the rotor, the position of the rotor is monitored at all times using a displacement sensor and the electromagnetic force must be so controlled according to the output signals of the displacement sensor that the rotor is stably supported. A control method called PID control is usually employed for a compensator for the magnetic bearing. There has been employed a control system which eliminates any deviation of the rotor from the center of the gap of the bearing. A system for controlling the magnetic bearing is disclosed in "Magnetic Levitation and Magnetic Bearing, Corona Co., Jun. 30, 1993, pp. 184–192" and "Active Magnetic Bearings, vdf Hoschschulverlag AG an der ETH Zuerich, 1994".

The bearing stiffness of a magnetic bearing is usually one-tenth smaller than the bearing stiffness of oil bearings. In a conventional machine using oil bearings' such as a centrifugal compressor or the like machine, therefore, the range of operation can be designed to lie between first and second critical speeds. By using the magnetic bearings, however, it is unavoidable to design the range of operation to lie between the 3rd and 4th critical speeds. The two modes from the lowest critical speed side are rigid modes of the rotor, and the 3rd and 4th critical speeds are bending modes of the rotor. There will be no problem in operation, if imbalanced vibration is suppressed to a sufficient degree and the range of operation is ensured despite an increase in the critical speed that results from a low bearing stiffness and that must hence be exceeded. Generally, however, the distances between critical speeds become smaller than the range of operation as the order becomes higher, which makes it difficult to design the rotor and the control circuit.

In order to cope with the vibration displacement of the rotor in the bending mode, Japanese Patent Laid-Open No. 280542/1993 discloses a method in which a displacement sensor is disposed near the electromagnet, and the action point of the electromagnet and the point of position detection are brought into agreement in order to improve the controllability. Though the method disclosed in this Japanese Patent Laid-Open No. 280542/1993 tries to improve the controllability of the bending mode by optimizing the arrangement of the displacement sensor, no consideration is given to the imbalance of the force, which is a major cause of bending vibration, thereby still leaving, a large bending displacement.

SUMMARY OF THE INVENTION

The object of the present invention is to realize a controller for controlling a magnetic bearing having an ideal damping effect by considering the difference in the mode of critical speeds of the third order and fourth order of a rotor and by setting an optimum gain in each of the modes.

Another object of the present invention is to provide a high-speed rotor equipped with a magnetic bearing that is capable of stably revolving up to a high-speed range.

A further object of the present invention is to provide a controller for controlling an active magnetic bearing for supporting a rotor that is operated at a speed higher than that in the bending mode thereof.

In order to achieve the above-mentioned objects according to the present invention, the control circuit is additionally provided with a mode decomposing/synthesizing circuit which decomposes a displacement signal of the rotor into an N-th order mode component and an (N+1)-th order mode component, changes the gain for each of the components and then resynthesizes the mode components. The displacement signal of the rotor is input to a tracking filter which picks up only components which are in synchronism with the rotational speeds, the output signal of the tracking filter is input to the mode decomposing/synthesizing circuit, a signal obtained by subtracting the output of the tracking filter from the displacement signal of the rotor is input to a compensator (PID control circuit), and a signal obtained by adding the output of the mode decomposing/synthesizing circuit to the output of the compensator is input to a power amplifier.

According to the present invention, furthermore, the displacement signal of the rotor is input to the mode decomposing circuit, the outputs representing every mode of the mode decomposing circuit are input to the tracking filter, signals obtained by subtracting the output of the tracking filter from the outputs representing every mode of the mode decomposing circuit are input to the compensator (PID control circuit), a signal obtained by adding the output of the compensator to the signal that is obtained by arbitrarily setting the gain of the output of the tracking filter is input to the mode synthesizing circuit, and the output of the mode synthesizing circuit is input to the power amplifier.

The invention provides a high-speed rotor assembly comprising a rotor, an active magnetic bearing for supporting the rotor, a displacement detection means for detecting the displacement of the rotor, and a magnetic bearing control means for controlling the active magnetic bearing, wherein the magnetic bearing control means comprises a filter means which picks up the synchronous components of the rotor from the displacement in a complex domain detected by the displacement detection means, a mode decomposing means which decomposes the output of the filter means into an N-th order mode and an (N+1)-th order mode, and a means that generates a control signal obtained by changing the phase of the displacement in a complex domain according to the rotational speeds when the displacement is detected by the displacement detection means for at least either the N-th order mode or the (N+1)-th order mode decomposed by the mode decomposing means.

Furthermore, there is provided a high-speed rotor assembly comprising a rotor, a plurality of magnetic bearings for rotatingly supporting the rotor, a displacement detection means for detecting the displacement of the rotor, and a magnetic bearing control means for controlling the magnetic bearings, wherein the magnetic bearing control means comprises a filter means which picks up synchronous components from the displacement detected by the displacement detection means, a mode decomposing means which decomposes the output signal of the filter means into mode components, and a mode synthesizing means which synthesizes the mode components according to the signal of the mode decomposition means and applies control currents to the plurality of magnetic bearings.

In the above-mentioned magnetic bearings, the range of operation must be set in a region exceeding the bending critical speed, and a sophisticated design is required for setting the distance between the 3rd and 4th critical speeds. In practice, vibration of the rotor largely results from imbalance. In order to suppress the vibration of the rotor, therefore, consideration needs to be given only to the vibration components that are in synchronism with the rotational speeds. By using a circuit, such as a tracking filter, therefore, the rotational speed component and the other components of the displacement signals of the rotor are discriminated. A signal obtained by removing the rotational speed component from the displacement signal is input to the control circuit, usually the PIC control circuit, in order to perform attenuation control of the components other than the rotational speed components, and additional provision is made of a circuit which executes a control law for the rotational speed component only. That is, when the displacement signals intersecting at right angles are denoted by X and Y, and the displacement in a complex domain is expressed by Z=X+iY, the added circuit outputs the result of multiplication of the rotational speed component of the displacement in a complex domain by a complex gain G=Gre+iGim=|G|*exp(iq). This output and the output of the above-mentioned control circuit (PID) are added together to generate a final control output in order to decrease vibration of the rotor due to imbalance. That is, when the rotational speed component of the displacement Z in a complex domain is denoted by ZN, then, $$ZN=XN+iYN=|ZN|exp\ (i\ (Wt+f))$$

where W is the angular velocity of revolution and f is the phase difference from the reference position of revolution (rotation pulse). Since the complex gain is |G|*exp (iq) as described above, the control output is expressed by $$G*ZN=|G|*ZNexp\ (i(Wt+f+q))$$

Considered below is how to determine the complex gain. As will be obvious when a one degree of freedom vibration system, is considered, the direction of imbalance in a region lower than the critical speed is in phase with the direction of vibration. Therefore, exerting a force in a direction opposite to the direction of vibration is effective in damping the vibration and is preferable from the standpoint of efficiency in exerting the force (see FIG. 16). This means that the complex gain is turned into a real gain (q=0) without an imaginary component, and this is equivalent to the control of the spring stiffness of the bearing in an actual device. In a bode plot showing the vibration response, this is indicated by a shift of the critical speed toward the higher speed side by an amount corresponding to the increase of the spring stiffness, and the amplitude of vibration decreases.

The direction of imbalance when the rotor is revolving just at the critical speed leads the vibration direction (phase q ) by 90 degrees. Therefore, the imbalance can be offset if the feedback is applied to advance the direction from the displacement in a complex domain by 90 degrees (q=90 degrees). In this case, the complex gain is an imaginary number without a real term. For this purpose, a feedback circuit that crosses between the X-direction and the Y-direction must be provided. The operation of setting forward by 90 degrees is equivalent to a differentiation operation, which corresponds to outputting a force that is proportional to the speed component based on the rotor displacement, and represents damping. It will therefore be understood that it is necessary to effect damping at a critical speed.

In a region higher than the critical speed, the direction of imbalance has an opposite phase to the direction of vibration. Therefore, the force should be output in the direction of the vibration. This corresponds to setting the complex gain to a negative real gain (q=180 degrees), i. e., causing a negative spring to function. In practice, however, the gain is set to zero at this rotational speed and the rotational speed component is not at all controlled. By bringing the gain to zero, the rotational speed component of the control current is brought to zero, which saves the electric power, and, besides, the rigid rotor rotates about the main axis of inertia thereof providing an advantage from the standpoint of vibration amplitude.

When the magnetic bearings are adapted to a practical device, radial bearings are in most cases arranged at the respective ends of the rotor. It is possible to apply a control law for single-input and single-output (SISO) control for each of the bearings in a decentralized control method. This system, however, does not achieve a maximum effect as a control law for the rotor that exhibits a multi-degree of freedom. In order to suppress the vibration amplitude at the foot of the 4th critical speed, for instance, if a gain schedule to increase the bearing stiffness at the foot of the 4th critical speed is made out, the 4th critical speed moves toward the higher speed side and the vibration amplitude decreases by a corresponding amount. At the same time, however, the 3rd critical speed increases, and damping of the vibration amplitude is not often obtained to a maximum degree by the effect of the foot of the 3rd critical speed. An ideal control is to lower the 3rd critical speed and raise the 4th critical speed, as shown in FIG. 15. It has therefore been desirable to realize such a control operation.

In order to realize this ideal control operation, according to the present invention, the signal is decomposed by a mode decomposing circuit into signal components for the respective modes, and a gain is imparted to each of the components. This makes it possible to control the 3rd and 4th modes independently. As a result, vibration due to imbalance is damped and, at the same time, the control current decreases, i.e., the bearing coil current decreases.

DESCRIPTION OF THE PREFERRED EMBODIMENTS

Figure 1:
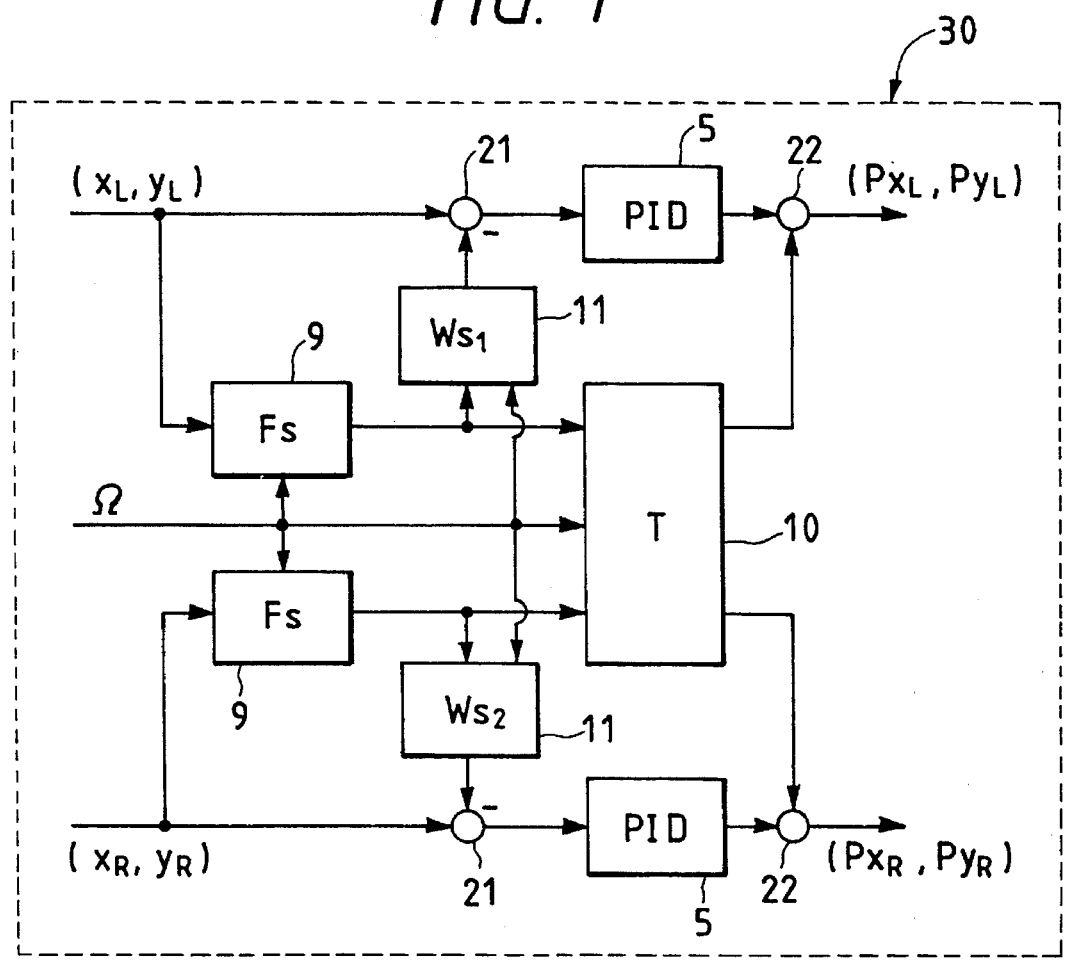
FIG. 1 is a block diagram illustrating an embodiment of the present invention.
Figure 2:
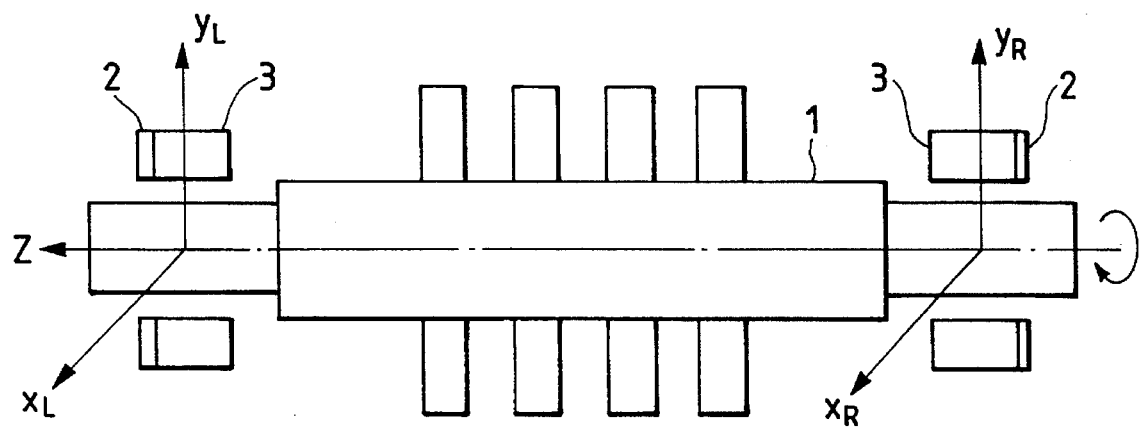
FIG. 2 is a diagram schematically illustrating a rotor equipped with magnetic bearings according to the present invention.

An embodiment of the present invention will now be described with reference to the drawings. FIG. 1 is a block diagram of a controller forming an embodiment according to the present invention, and FIG. 2 illustrates a rotor equipped with the magnetic bearings shown in FIG. 1 and in which radial bearings are mounted at both end portions of a rotary shaft. These drawings illustrate only the controlling of the radial bearings, but do not show thrust bearings. Each radial bearing 3 is provided with a radial sensor 2 for measuring the displacement of the rotor 1 in the radial direction. The rotor 1 has two degrees of freedom in the radial direction for each of the radial bearings 3. Therefore, the radial bearings 3 generate forces in directions perpendicular to each other in accordance with these degrees of freedom, and the rotor 1 is corresponding by these forces. The radial sensors 2 detect displacement in two directions of the rotor 1 corresponding to the two directions of the forces of the radial bearing. Here, the rotor displacement at the bearing on the left side is denoted by XL and YL, and the rotor displacement at the bearing on the right side is denoted by XR and YR.

Figure 3:
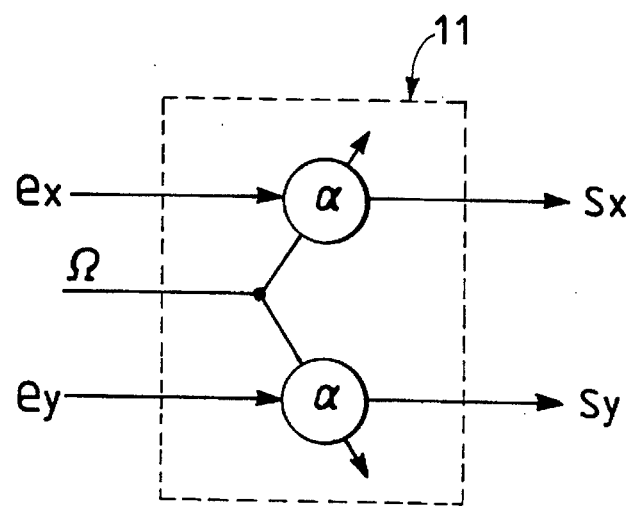
FIG. 3 is a diagram which explains a gain controller.

In FIG. 1, displacement signals (XL, YL) and (XR,YR) of the rotor 1 detected by the radial sensors are input to tracking filters 9, and only a nutation (forward) component is taken out. Though in FIG. 1 each signal path is shown by a single line, two kinds of signals, one in the X-direction and one in the Y-direction, pass through these signals paths. The signals representing the nutation (forward) components picked up by the tracking filters (Fs) 9 are input to gain controllers (Ws1, Ws2) 11 together with a rotational speed signal Ω. As shown in detail in FIG. 3, after being multiplied by a gain α that varies depending upon the rotational speed, the signals are input as output signals (SX, SY) to subtractors 21. The original displacement signals (XL,YL) and (YR, YR) are input to the subtractors 21 together with output signals of the gain controllers 11 and the result is input to compensators (PID) 5. Here, α=1 means that no rotational speed component is input to the compensators 5. Usually, 1 or 0 is selected as the value of α. Therefore, the gain controllers 11 act like switches that turn the signals on and off according to the rotational speed W.

Figure 4:
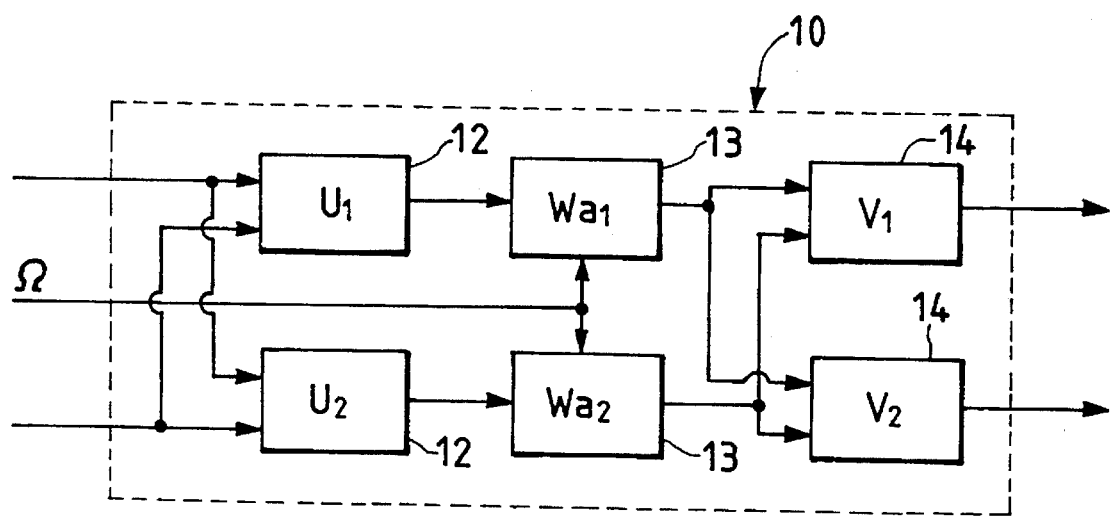
FIG. 4 is a diagram which explains a mode gain controller.
Figure 5:
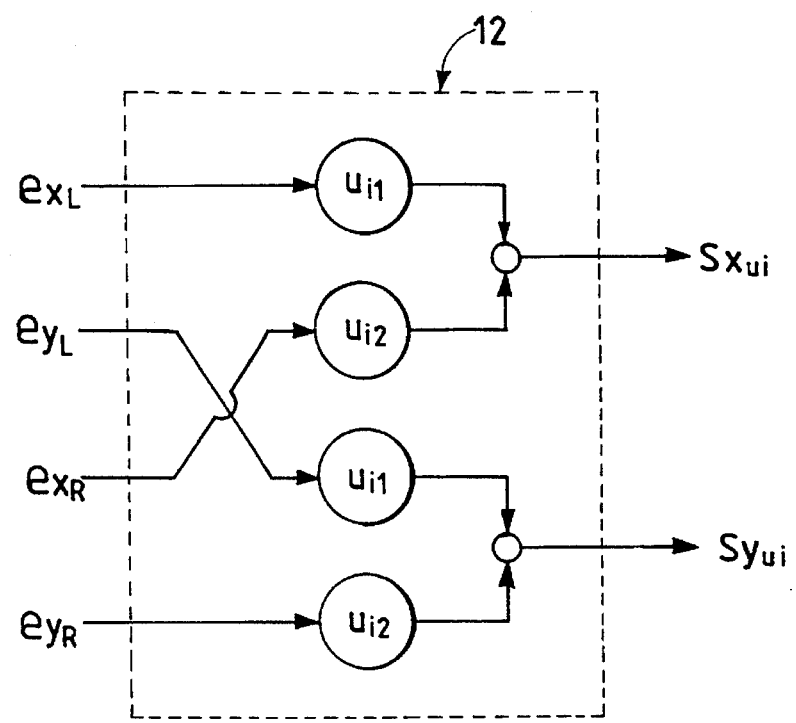
FIG. 5 is a diagram which explains a mode decomposing circuit.
Figure 6:
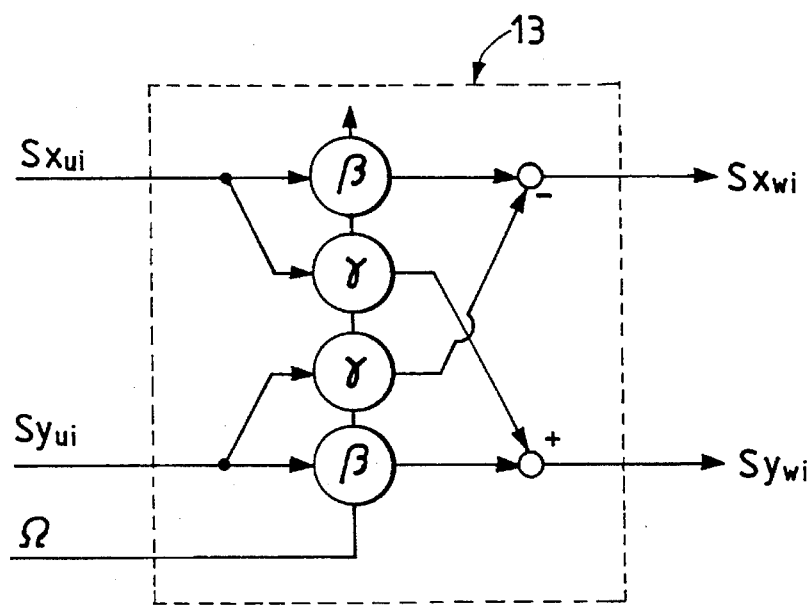
FIG. 6 is a diagram which explains a gain setting circuit.
Figure 7:
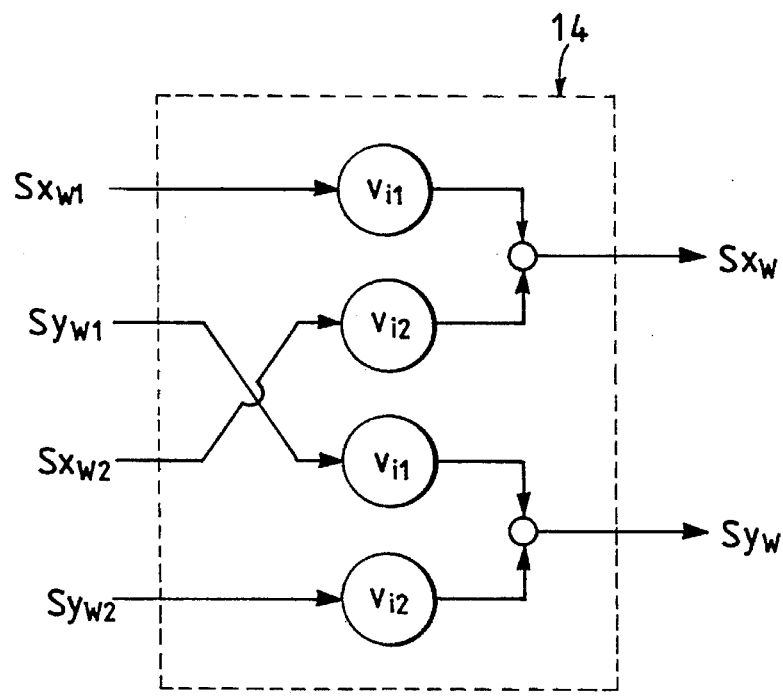
FIG. 7 is a diagram which explains a mode synthesizing circuit.

The output signals of the tracking filters are also inputted to a mode gain controller 10. FIG. 4 illustrates in detail the mode gain controller 10. The output signals from the tracking filters 9 inputted to the mode gain controller 10 are first decomposed into components according to the modes by mode decomposing circuits 12, and are then given suitable gains for each mode by the gain controllers 13. Then, mode synthesizing circuits 14 distribute the signals for each of the bearings. FIGS. 5, 6 and 7 illustrate the structures of the mode decomposing circuit 12, gain controller 13 and mode synthesizing circuit 14.

In the mode decomposing circuit 12, coefficients uij (i, j=1, 2) are determined by the following relations, $$u11 = A1*f4R \quad (1)$$

$$u12 = A1*f4L \quad (2)$$

$$u21 = A2*f3R \quad (3)$$

$$u22 = A2*f3L \quad (4)$$

Figure 8:
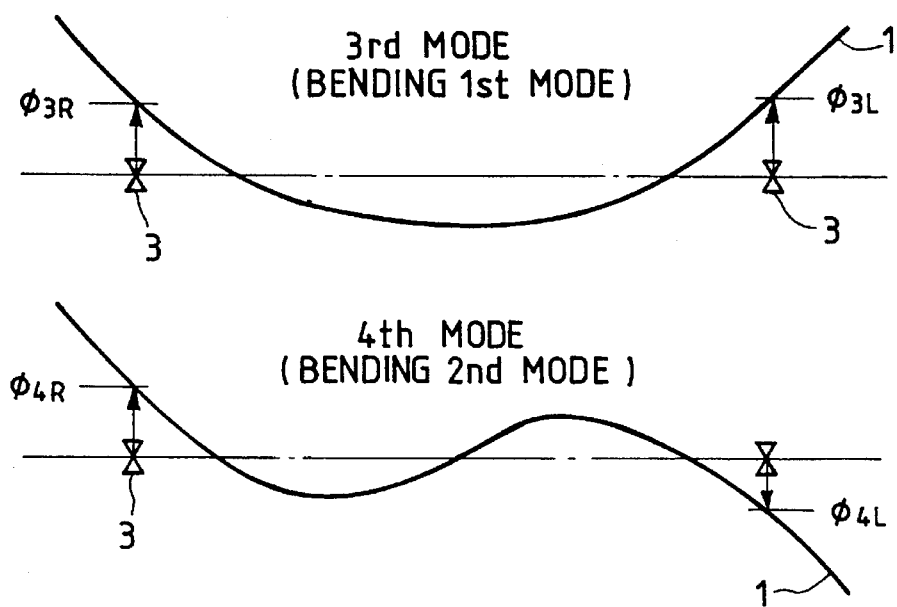
FIG. 8 is a diagram illustrating the shapes of bending modes of a rotor.

Here, as shown in FIG. 8, (f3L, f3R) and (f4L,f4R) represent vibrations of the rotor at the bearing points, i.e., represent components of the 3rd mode and a component of the fourth-order mode in the mode shape. Symbols A1 and A2 denote constants for scaling in the circuits. If these operations are carried out, the output of the mode decomposing circuit (U1) will not at all include the displacement component of the 4th mode, and the output of the mode decomposing circuit (U2) will not at all include the displacement component of the 3rd mode.

The output signals of the mode decomposing circuits (U1, U2) are input to the gain controllers (Wa1, Wa2), respectively. A coefficient y in the gain controller 13 is an interconnection gain between the X-direction and the Y-direction, as seen in FIG. 6. By adjusting the coefficients B and Y, two-dimensional displacement vectors in the X-direction and in the Y-direction can be converted into vectors of any magnitude in any direction. Here, B and Y vary depending upon the rotational speed. Usually, B >0 and Y=0 are selected to obtain a spring stiffness, or B=0 and Y >0 are selected to obtain a damper effect. The vectors converted at this time are 90 degrees ahead of the initial vectors. When B<0 is selected, a negative spring stiffness is obtained making it possible to lower the critical speed. The gain can be set independently for each of the 3rd mode and the fourth-order mode, making it possible to increase the 4th critical speed without changing the 3rd critical speed. The coefficients B and Y which are regarded as a complex gain having a phase angle y can, then, be expressed by tan y=Y/B.

Coefficients vij (i, j=1, 2) in the mode synthesizing circuit 14 can be determined by the following relations, $$V11 = B2*f3L \quad (5)$$

$$V12 = B1*f4L \quad (6)$$

$$V21 = B2*f3L \quad (7)$$

$$V22 = B1*f4R \quad (8)$$

where B1 and B2 are constants for scaling in the circuits, and f3L, f4L, f3R and f4R are mode components of vibration of the rotary shaft at the aforementioned bearing points. As a result of the calculation, the mode synthesizing circuit (V1) outputs a signal for the bearing on the left side in FIG. 2, and the mode synthesizing circuit (V2) outputs a signal for the bearing on the right side. Then, the output signals of the compensators 5 and the output signals of the mode gain controller 10 are added together through adders 22 to generate command signals (PXL, PYL) and (PXR, PYR) of the power amplifier.

Figure 9:
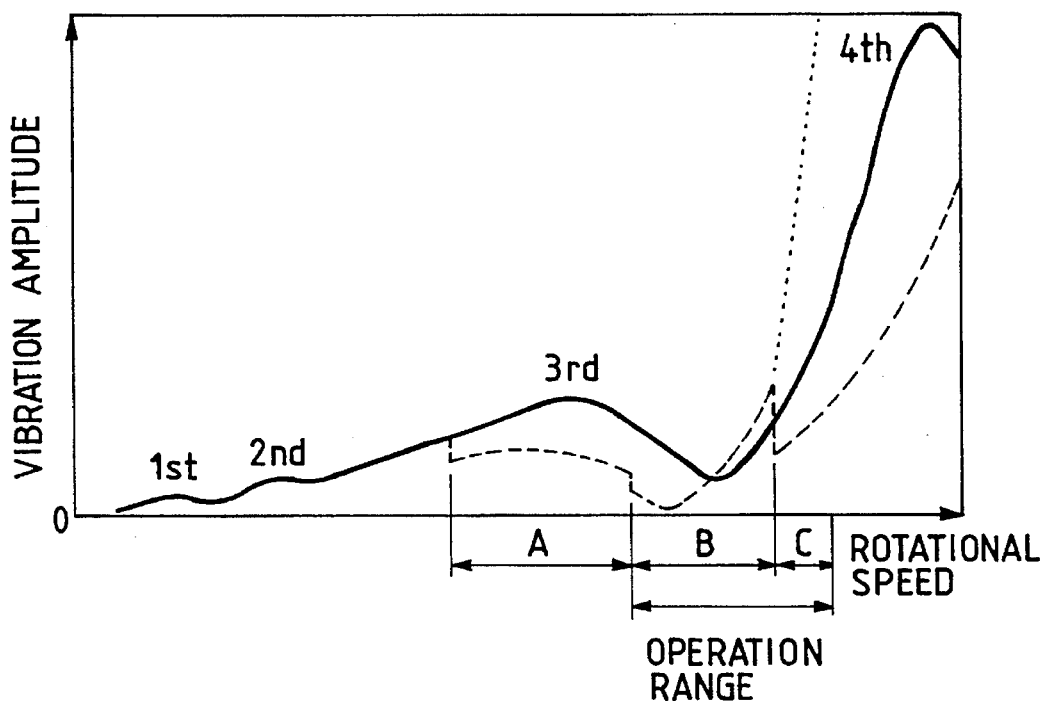
FIG. 9 Is an imbalance response diagram relating to an embodiment of the present invention.
Figure 10:
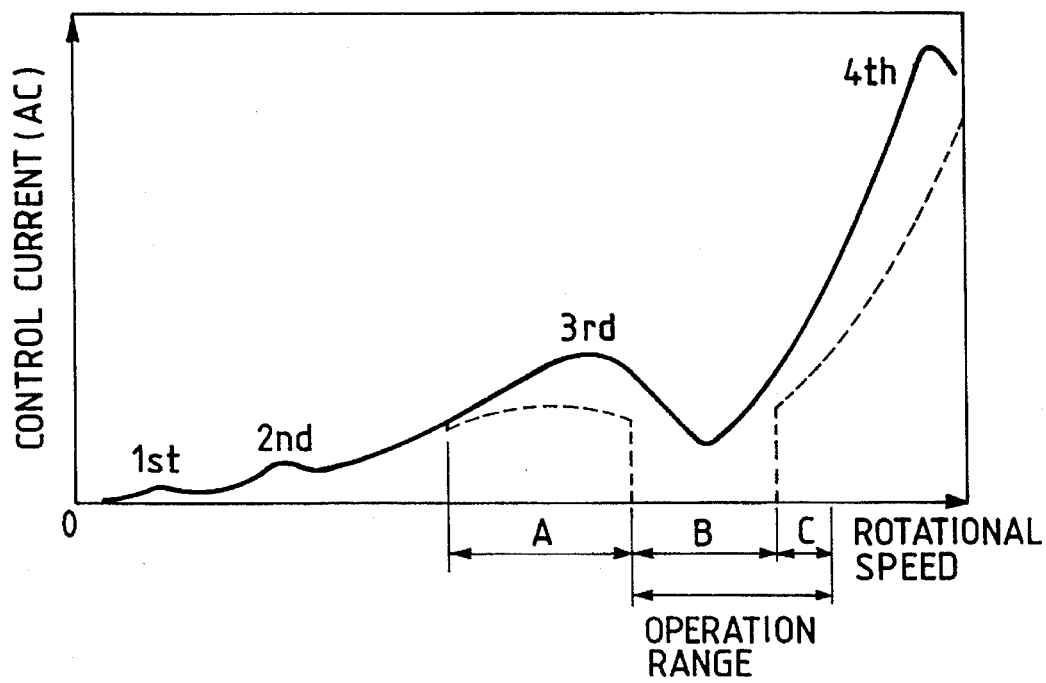
FIG. 10 is a diagram of control current for each of the numbers of revolutions of the embodiment according to the present invention.

Described below with reference to FIGS. 9 and 10 is an embodiment for operating the rotor equipped with the thus constituted control circuit for controlling the magnetic bearings. FIG. 9 shows vibration amplitudes of the rotor at each of the rotational speed, and FIG. 10 shows the amounts of AC components of the control current (bearing coil current) at that moment.

Figure 16:
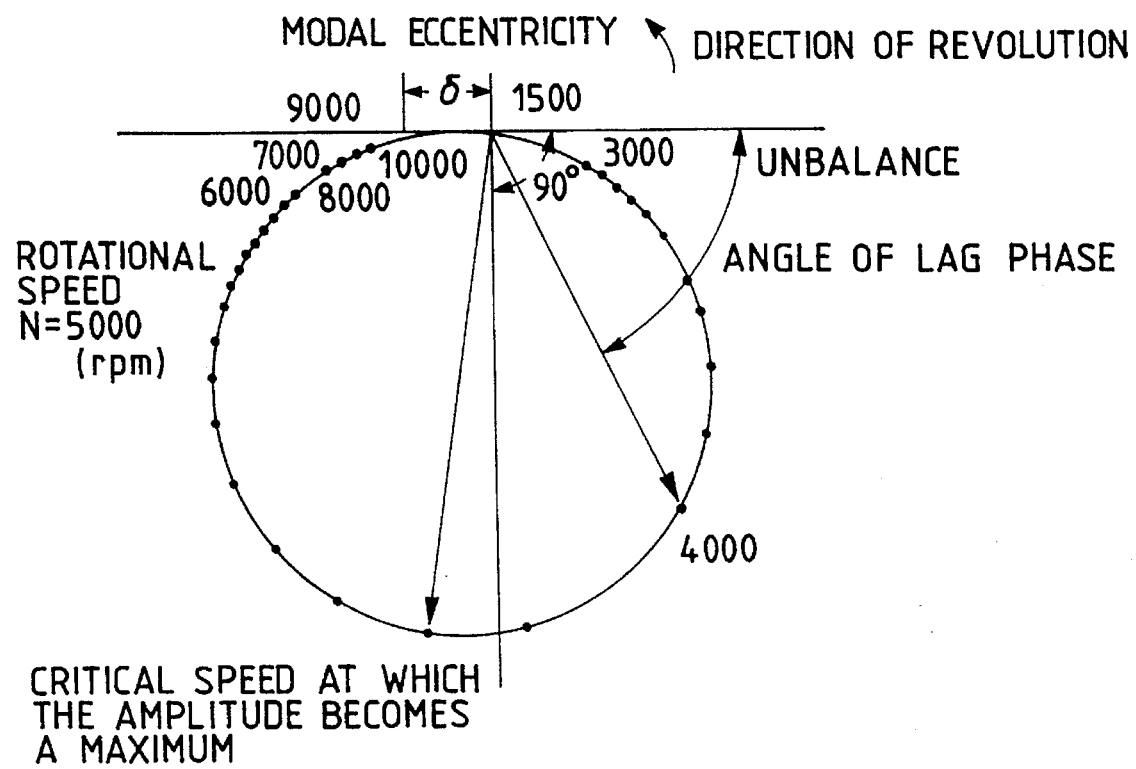
FIG. 16 is a diagram of a polar circle for explaining imbalance response of a vibration system of one degree of freedom.

The eigen modes at the critical speed are approximately orthogonal to each other. Therefore, the imbalanced response at a given position in the axial direction is expressed by the following equation as the superposition of the modes, where wr is a critical speed of r-th order, zr is a damping ratio of r-th order, fr is an eigen mode of r-th order, and er is an equivalent eccentricity of the r-th order mode. It can be regarded that the mode gain controller 10 is capable of controlling the terms in equation (9) related to the third order and the fourth order independently of each order. Therefore, the gain scheduling determines the values B and Y of the gain controllers 11 according to the angle of phase shift of vibration response for the imbalance, with reference to the 3rd and 4th polar circles shown in FIG. 16. A specific gain scheduling method will now be described with reference to FIGS. 9 and 10.

In a region A where the rotational speed of the rotor is close to the 3rd critical speed, the rotor vibrates with a bending mode of the first order. In this state, first, the gain of the gain controllers 11 is set to 1, so that the compensator 5 does not calculate the signal of the rotational speed component. In the gain controller (Wa1) 13, furthermore, B=0 and Y>0 are selected to obtain damping for the 3rd mode. In the gain controller (Wa2) 13, on the other hand, B>0 and Y=0 are selected to obtain spring stiffness for the fourth-order mode, so that the 4th critical speed is brought away toward the higher speed side. When there is little margin for the control current, a relationship B=Y=0 is selected in the gain controller (Wa2) 13 to decrease the control current even though the damping of vibration is sacrificed to some extent.

Next, when the rotational speed of the rotor lies within an operation range B, relationships A=1 and B=Y=0 are selected, and no control operation is carried out for the forward vibration in synchronism with the rotational speed. This is a control mode called Automatic Balancing System (ABS). In this mode, the AC component in the control current becomes 0, and the rotor 1 rotates about the main axis of inertia thereof.

As the rotational speed of the rotor rises up to an operation range C to approach the 4th critical speed, the vibration amplitude increases. In this operation range C, a=1 is selected and besides g=0 and B<=0 are selected in the gain controller (Wa1) 13 to bring the 3rd critical speed toward the lower speed side. In the gain controller (Wa2) 13, on the other hand, B>0 and Y=0 are selected to obtain a spring stiffness for the fourth-order mode and to bring the 4th critical speed toward the higher speed side.

The solid curve shown in FIG. 9 represents the vibration amplitude in which the ordinary PID control is employed to the magnetic bearings supporting the rotor, and the broken line represents the case where the control operation of the present invention is adopted. The portion where the broken line is extended by the dotted line represents the vibration amplitude when the application of ABS is simulated. In FIG. 10, like FIG. 9, the solid line represents the AC components in the control current when the ordinary PID control is employed, and the broken line represents the case where the control operation of the present invention is adopted. It can be understood that not only the vibration, but also the control current, can be decreased.

Figure 11:
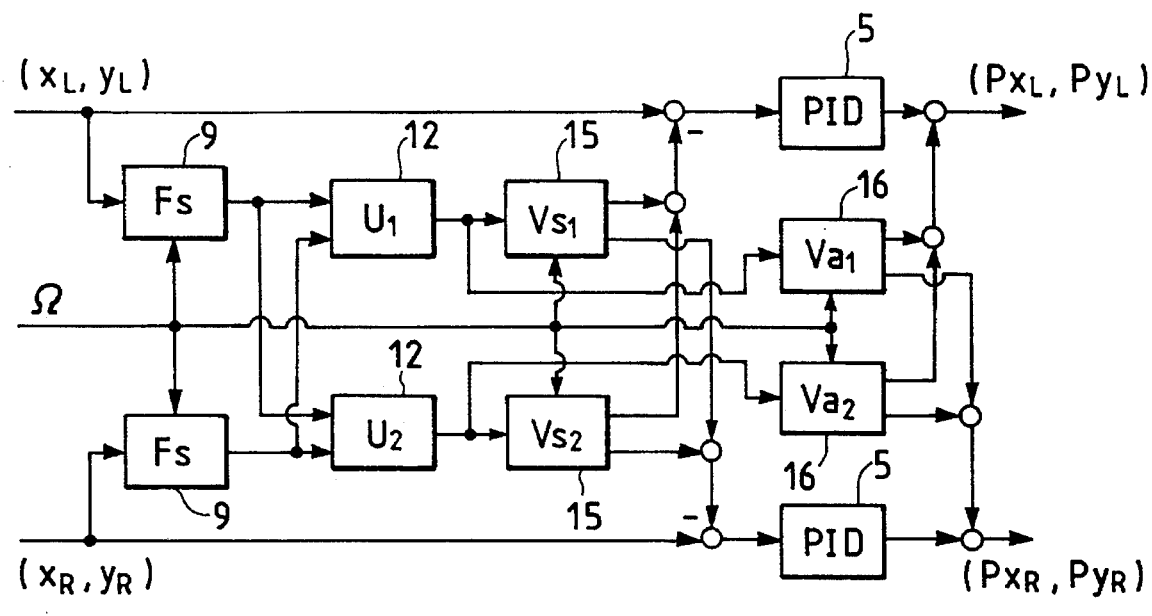
FIG. 11 is a block diagram illustrating another embodiment of the present invention.

FIG. 11 illustrates a modification of the first embodiment shown in FIG. 1. In FIG. 1, the signal obtained by subtracting the forward rotational speed component from the displacement signal is input to the compensator 5. In this modified embodiment, however, the component of the 3rd mode and the component of the 4th mode are subtracted independently when the nutation (forward) component is subtracted from the displacement signal. Therefore, a variety of control modes can be set as represented by a method which effects PID control only for the component of the 3rd mode and the nutation component control for the component of the 4th mode, a method which effects the PID control for the component of the 4th mode and nutation component control for the component of the 3rd mode, and a method which arbitrarily sets the ratio of the PID control to the nutation component control for each of the mode controls.

Figure 12:
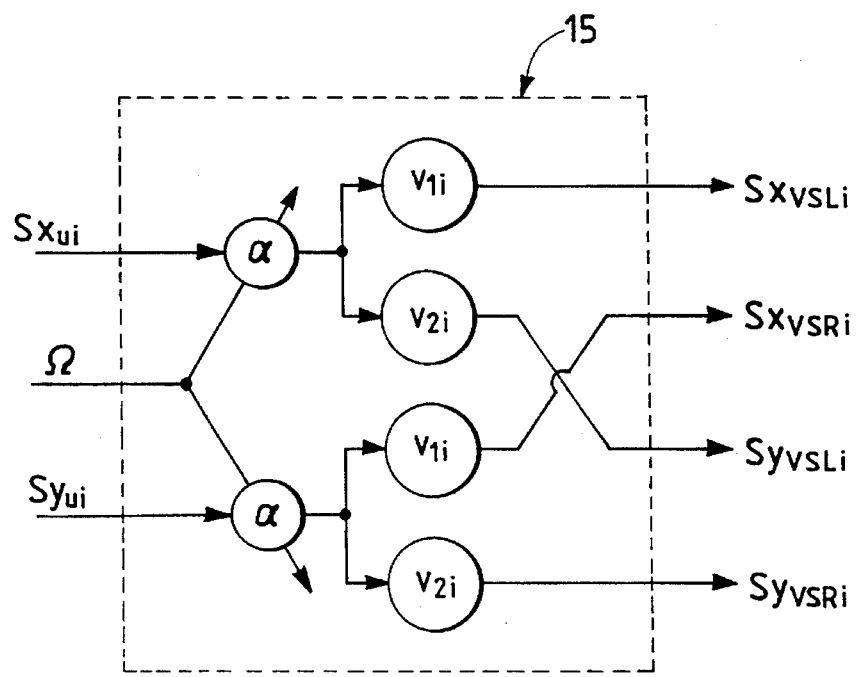
FIG. 12 is a diagram of a gain controller of another embodiment of the present invention.
Figure 13:
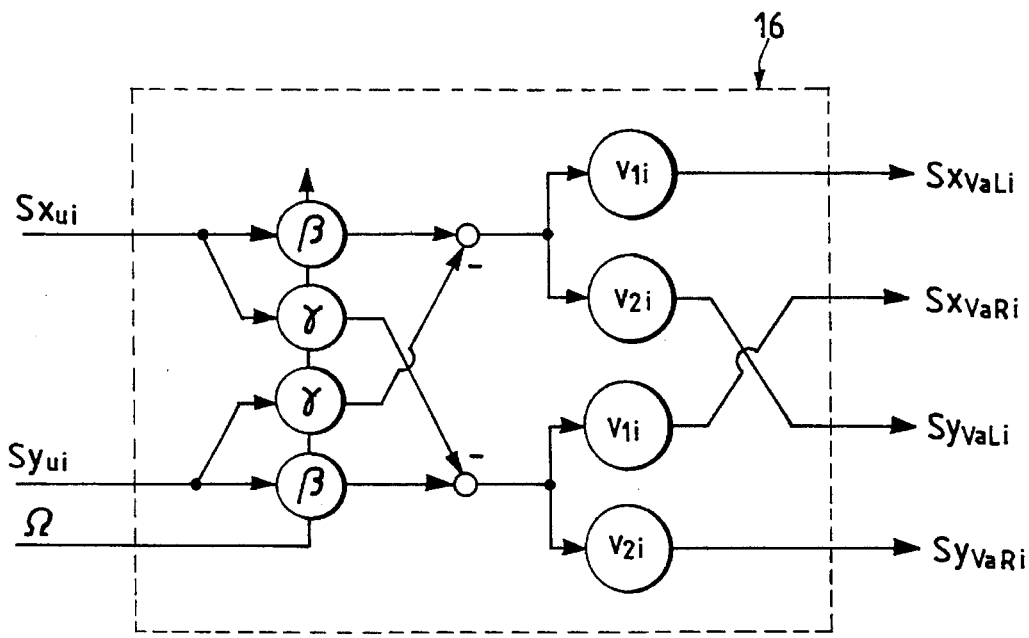
FIG. 13 is a diagram of a gain controller of the present invention.

FIGS. 12 and 13 illustrate in detail the gain controller (Vai, i=1, 2) 15 and the gain controller (Vai, i=1,2) 16 that are shown in FIG. 11.

The gain controller (Vai) 15 adjusts the amount of nutation components input to the compensator 5 for the 3rd and 4th modes independently of each other. The gain controller (Vai) 16 sets the gain for each of the modes and produces outputs that are distributed for the right and left bearings. Which one of the above-mentioned control modes is adopted varies depending upon the scheduling of coefficients A, B and Y. This modified embodiment is different from the embodiment of FIG. 1 only with respect to the position of the gain controller 11. That is, in the embodiment of FIG. 1, the gain controllers 11 are disposed in front of the mode decomposing circuits 12. In this modified embodiment, however, the gain controllers 15 are disposed after the mode decomposing circuits 12.

Figure 14:
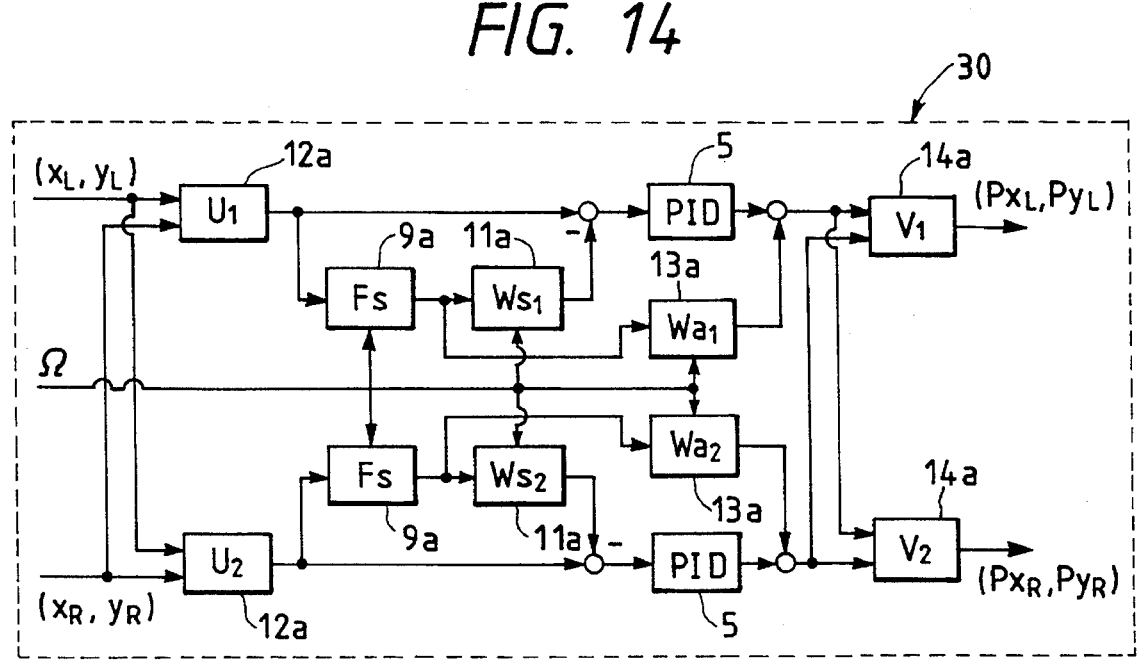
FIG. 14 is a block diagram illustrating a still another embodiment of the present invention.
Figure 15:
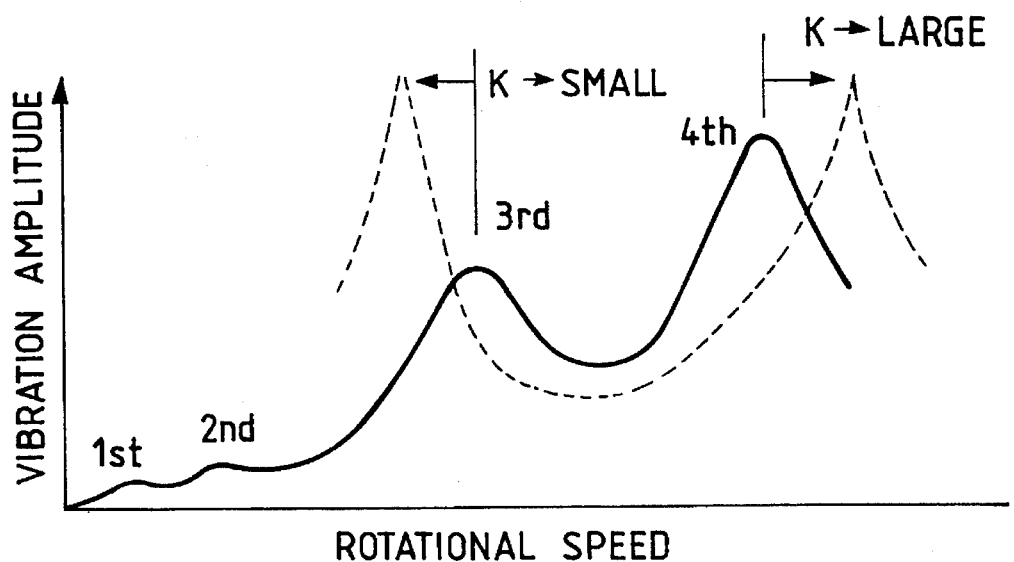
FIG. 15 is a diagram for ideally controlling a critical speed.

FIG. 14 illustrates another modification of the embodiment of FIG. 1. In this modified embodiment, elements corresponding to those of the embodiment of FIG. 1 are denoted by the same reference numerals, but to which a is affixed. Here, the reason why a is affixed is that input and output signals are slightly different. In this modification, displacement signals (XL, YL) and (XR, YR) are first divided into the 3rd and 4th components by mode decomposing circuits (Ui, i=1, 2) 12a. The mode components are then input to tracking filters (Fs) 9a where the nutation components are picked up. To a compensator 5 are inputted signals that are obtained by subtracting the amount obtained by multiplying the nutation component by A coefficient A determined by A gain controller (Wai, i=1, 2) similar to the gain controller of FIG. 3, from the components of the modes picked up by tracking filters (Fs) 9a. Furthermore, the output of the tracking filter (Fs) 9a is fed to the gain controller (Wai, i=1, 2) 13a. The coefficients B and Y are multiplied in the gain controller 13a to set the gain. Moreover, the output of the compensator 5a is added to the gain that is set to determine the final controlled variable for each of the modes. The controlled variables for the modes are synthesized again into the control amounts of the respective bearings by mode synthesizing circuits (Vi, i=1, 2) 14a. In this modified embodiment, the control system is completely divided into a 3rd mode control system and a 4th mode control system, and the displacement signals decomposed for each of the modes are input to the tracking filters 9a and even to the compensators 5a. This makes it possible to simplify the constitution of the control system for each of the modes. Another advantage is that the compensator 5a can be designed for each of the modes independently.

Figure 17:
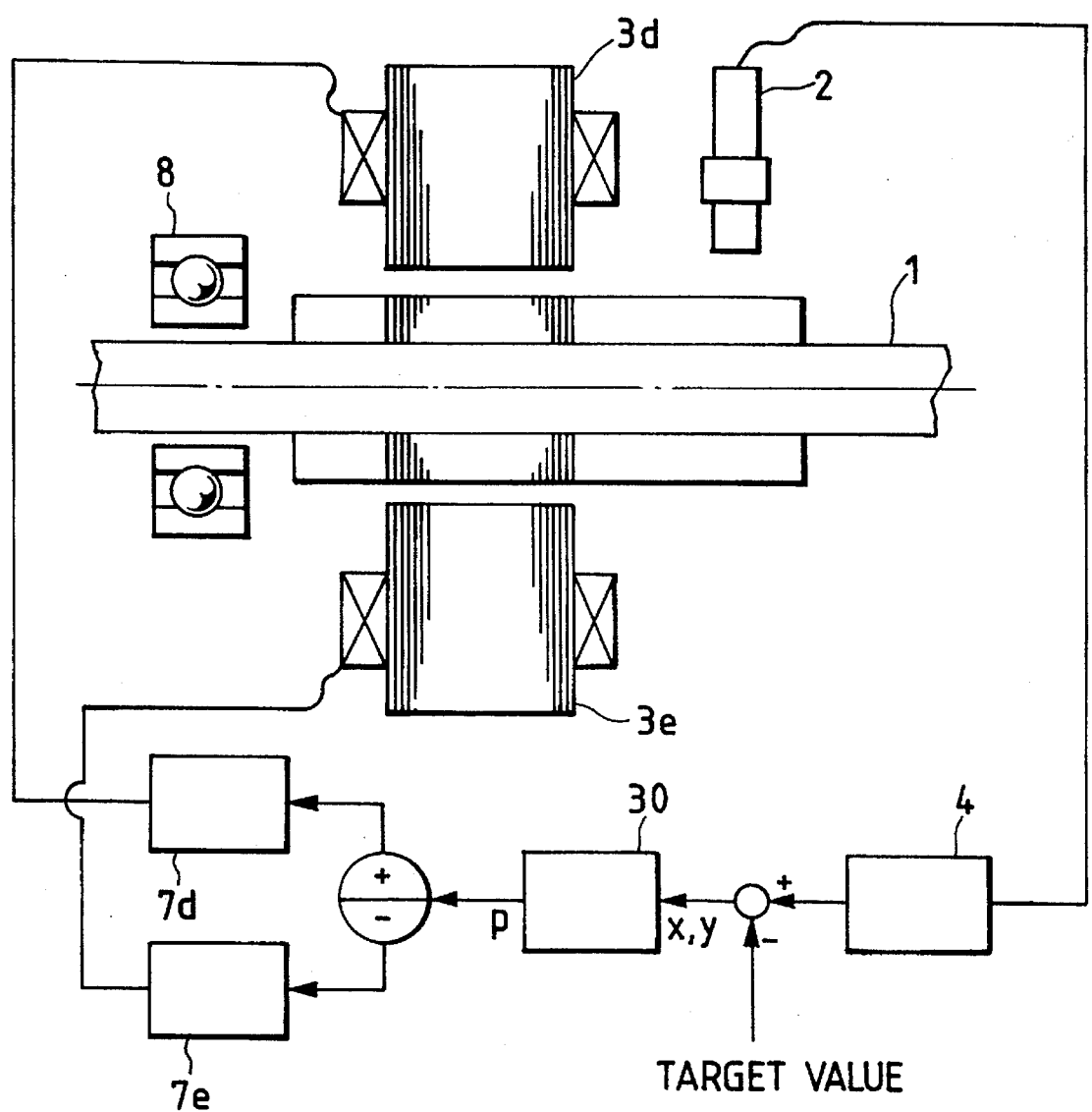
FIG. 17 is a diagram illustrating the construction of a high-speed rotor according to the present invention.

Next, FIG. 17 illustrates an embodiment of a high-speed rotor equipped with the above-mentioned magnetic bearings. A rotor 1 is rotatably supported by magnetic bearings 3d, 3e, and the displacement of vibration is detected by a sensor 2. The output of the sensor 2 is input to a controller 30 via a converter 4, and control currents are fed to magnetic bearings 3d, 3e via circuits 7d, 7e that produce the control currents, of the magnetic bearings. At one end of the rotor is provided a touch-down bearing 8 as an auxiliary bearing. The thus constituted high-speed rotor uses the controller 30 for controlling the magnetic bearings shown in FIG. 1 or 14, so that the rotor is allowed to rotate at a high speed.

According to the present invention, the damping force against an imbalanced vibration is increased at the time of passing through a critical speed. Therefore, the critical speed is passed through with a small resonance vibration and safely even though the rotor is not accurately balanced. Besides, the balancing of the rotor can be simplified. Moreover, even when foreign matter adheres to the rotor while it is rotating and the amount of imbalance is accordingly increased, the critical speed can be passed through with an amplitude maintaining a sufficient amount of margin. By setting the direction the vector of the control gain according to the rotational speed, furthermore, a maximum vibration damping amount is obtained with the same control current.

What is claimed is:

1. A high-speed rotor assembly comprising a rotor, active magnetic bearings for supporting the rotor, displacement detection means for detecting a displacement of said rotor, and magnetic bearing control means for controlling said active magnetic bearings, wherein said magnetic bearing control means comprises filter means which picks up a rotational speed synchronous component of said rotor from a displacement in a complex domain detected by said displacement detection means, mode decomposing means which decomposes the output of said filter means into a N-th order mode vibration and a (N+1)-th order mode vibration, and means that generates a control signal such that the phase of said displacement in a complex domain is varied according to the rotational speed in which the displacement is detected by said displacement detection means for at least either the N-th order mode or the (N+1)-th order mode decomposed by said mode decomposing means.

2. A high-speed rotor assembly according to claim 1, wherein said magnetic bearing control means is provided with a means which:
   when said rotational speed is a critical speed of said N-th order vibration mode, advances the phase of a control signal related to the decomposed N-th order vibration mode by 90 degrees ahead of the phase of the displacement in a complex domain thereof, to make the control signal related to the decomposed (N+1)-th order vibration mode represent a positive real gain;
   when said rotational speed lies between the N-th order vibration mode and the (N+1)-th order vibration mode, sets to zero control gains related to the decomposed N-th order vibration mode and the (N+1)-th order vibration mode; and
   when said rotational speed is smaller than a critical speed of the (N+1)-th vibration but is close thereto, makes the control signal related to the N-th order vibration mode represent zero or a negative real gain and makes the control signal related to the (N+1)-th order vibration mode represent a positive real gain.

3. A high-speed rotor assembly comprising a rotor, a plurality of magnetic bearings for rotatingly supporting the rotor, displacement detection means for detecting a displacement of said rotor, and magnetic bearing control means for controlling said magnetic bearings,
   wherein said magnetic bearing control means comprises filter means which picks up a rotational speed component from a displacement detected by said displacement detection means, and a mode gain controller which mode-decomposes the output signal of said filter means into mode components, sets a gain for the mode components, synthesizes the mode components, and outputs a control signal for said plurality of magnetic bearings.

4. A high-speed rotor assembly according to claim 3, wherein said magnetic bearings are radial magnetic bearings disposed at respective end portions of said rotor, said displacement detection means is disposed near said rotor and detects four independent displacements in radial directions of the rotor, and wherein said mode gain controller comprises a mode decomposing means which decomposes vibration modes of two consecutive orders of said rotor based upon an output of said filter means, a gain setting means which adjusts the output gain of the mode decomposing means, and a mode synthesizing means which outputs said control signal for of the bearings based upon the output of the gain setting means.

5. A controller for controlling active magnetic bearings for rotatingly supporting a rotor, which controller outputs control currents for driving the active magnetic bearings based upon the output of a displacement detection means which is located close to the magnetic bearings and which detects four independent displacements in radial directions of the rotor,
   wherein said controller comprises a filter means which receives displacement amounts detected by said displacement detection means and picks up a nutation component of the rotor, and a mode decomposing means which decomposes an output of the filter means into vibration components of two independent vibration modes based upon a vibration mode shape at a displacement sensor of said rotor, so as to independently subject the vibration components decomposed for the respective vibration modes to a control law.

6. A controller for controlling active magnetic bearings according to claim 5, wherein said controller further comprises a means which picks up a nutation component of said rotor from at least either the N-th order vibration mode or the (N+1)-th order vibration mode, where N is a positive integer; a means which forms a displacement vector from displacements in two independent radial directions that are picked up, converts said displacement vector based upon a phase difference between said displacement vector at said rotational speed and an imbalance force calculated from said displacement vector, and determines a complex gain used for feedback control; and a means which determines a control variable for each of the modes by multiplying said displacement vector by said complex gain and effects an inverse conversion of a mode decomposition.

7. A controller for controlling active magnetic bearings according to claim 6, further including means which:
   when said rotational speed is a critical speed of said N-th order vibration mode, advances the phase of said complex gain related to the displacement vector of the N-th order vibration mode that is picked up by 90 degrees ahead of the phase of the displacement vector, and causes said complex gain related to the displacement vector of the (N+1)-th order vibration mode that is picked up to represent a real gain;
   when said rotational speed lies between the N-th order vibration mode and the (N+1)-th order vibration mode, sets complex gains, related to both the displacement vectors of the N-th and (N+1)-th order vibration modes that are picked up, to zero; and when said rotational speed is smaller than a critical speed of the (N+1)-th vibration but is close thereto, causes a complex gain related to the displacement vector of the N-th order vibration mode to represent zero or a less than zero real gain and a complex gain related to the displacement vector of the (N+1)-th order vibration mode to represent a positive real gain.

8. A controller for controlling active magnetic bearings comprising an operation means which calculates control amounts for control of radial magnetic bearings, disposed near displacement detection means based upon the outputs of said displacement detection means, which are disposed at respective of a rotor, and which detects four displacements (XL, YL), (XR, YR) in radial directions of the rotor, said controller further comprising:

filter means for picking up nutation components (XNL, YNL) and (XNR, YNR) which are synchronous with the rotational speed of said rotor, from said four displacement signals (XL, YL) and (XR, YR);

a mode decomposing means which subjects said nutation components (XNL, YNL) and (XNR, YNR) to a linear transform according to a first control signal obtained by inputting to said operation means the difference between the displacement signals (XL, YL), (XR, YR) and amounts proportional to said nutation components (XNL, YNL) and (XNR, YNR), and according to the specific amplitude of said rotor at a bearing position of two independent vibration modes, and which decomposes them into components (XN1, YN1) and (XN2, YN2) for the respective vibration modes;

a gain setting means for linearly transforming complex vectors formed from the components (XN1, YN1) and (XN2, YN2) of each of said modes into other complex vectors (AN1, BN1) and (AN2, BN2);

a mode synthesizing means which converts said complex vector components (AN1, BN1) and (AN2, BN2) into components for the respective bearings according to specific amplitudes at the bearings of the two vibration modes, and which calculates the total amount of control signals for each of the bearings; and a means which adds up and amplifies a second control signal generated by said mode synthesizing means and the first control signal, and which supplies drive currents to said radial magnetic bearings.

* * * * *